US009570010B2

(12) United States Patent
Yang

(10) Patent No.: US 9,570,010 B2
(45) Date of Patent: Feb. 14, 2017

(54) ORGANIC LIGHT-EMITTING DIODE PIXEL CIRCUIT AND DRIVING METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Shengji Yang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/654,019

(22) PCT Filed: Nov. 11, 2014

(86) PCT No.: PCT/CN2014/090803
§ 371 (c)(1),
(2) Date: Jun. 19, 2015

(87) PCT Pub. No.: WO2015/196700
PCT Pub. Date: Dec. 30, 2015

(65) Prior Publication Data
US 2016/0260380 A1    Sep. 8, 2016

(30) Foreign Application Priority Data

Jun. 23, 2014 (CN) .......................... 2014 1 0283087

(51) Int. Cl.
*G09G 3/3258* (2016.01)
*G09G 3/32* (2016.01)
*G06K 9/00* (2006.01)

(52) U.S. Cl.
CPC ........... *G09G 3/3258* (2013.01); *G06K 9/0002* (2013.01); *G09G 3/32* (2013.01);
(Continued)

(58) Field of Classification Search
CPC .. G06F 3/0412; G06F 3/044; G09G 2320/043; G09G 3/32; G09G 3/3258; G09G 2300/0819; G09G 2310/0251; G09G 2320/045; G09G 2300/0842; G09G 2300/0861; G09G 3/3233; G09G 2354/00; G06K 9/0002
(Continued)

(56) References Cited

U.S. PATENT DOCUMENTS 8,618,865 B1 * 12/2013 Lu ........................... G06F 3/044
327/517
2004/0174324 A1 * 9/2004 Yamazaki ........... G06F 3/03545
345/76
(Continued)

FOREIGN PATENT DOCUMENTS

CN    103034365 A    4/2013
CN    103135846 A    6/2013
(Continued)

OTHER PUBLICATIONS

International search report, mailed Mar. 30, 2015, of PCT/CN2014/090803 with the English translation of form PCT-ISA-237.
(Continued)

*Primary Examiner* — Dmitriy Bolotin
(74) *Attorney, Agent, or Firm* — Nath, Goldberg & Meyer; Joshua B. Goldberg; Stanley Protigal

(57) ABSTRACT

The present invention can solve the problem that an existing organic light-emitting diode pixel circuit has a single function or a complicated structure. An organic light-emitting diode pixel circuit of the present invention includes: a touch
(Continued)

fingerprint detection module configured to detect whether a touch occurs or not and whether the touch is caused by a convex portion of a fingerprint or a concave portion of the fingerprint, and send a result of the detection to a read line, under the control of a first scanning signal and a second scanning signal; and a compensation display module including an organic light-emitting diode and at least one driving transistor, and configured to eliminate a shift of a threshold voltage of the driving transistor and drive the organic light-emitting diode to display under the control of at least the first scanning signal, the second scanning signal, and a data signal.

15 Claims, 8 Drawing Sheets

(52) U.S. Cl.
CPC .............. *G09G 2300/0819* (2013.01); *G09G 2310/0251* (2013.01); *G09G 2320/045* (2013.01); *G09G 2354/00* (2013.01)

(58) Field of Classification Search
USPC .............................. 345/76, 77, 173, 174, 212
See application file for complete search history.

(56) References Cited

U.S. PATENT DOCUMENTS

| | | | |
|---|---|---|---|
| 2011/0169798 A1 | 7/2011 | Lee et al. | |
| 2012/0287025 A1* | 11/2012 | Inoue | G09G 3/3233 345/76 |
| 2013/0069537 A1 | 3/2013 | Sun et al. | |
| 2014/0168127 A1* | 6/2014 | Yang | G06F 3/0416 345/173 |
| 2014/0192035 A1* | 7/2014 | Tai | H01L 27/14643 345/211 |
| 2014/0210777 A1* | 7/2014 | Saito | G06F 3/0416 345/174 |
| 2014/0218327 A1* | 8/2014 | Shi | G06F 3/041 345/174 |
| 2015/0053947 A1* | 2/2015 | Qing | G09G 3/3233 257/40 |
| 2015/0177884 A1* | 6/2015 | Han | G06F 3/044 345/174 |
| 2015/0221255 A1* | 8/2015 | Qing | G06F 3/0412 345/173 |
| 2016/0225313 A1* | 8/2016 | Qing | G09G 3/3233 345/174 |

FOREIGN PATENT DOCUMENTS

| | | |
|---|---|---|
| CN | 103208255 A | 7/2013 |
| CN | 103218972 A | 7/2013 |
| CN | 103236238 A | 8/2013 |
| CN | 103310729 A | 9/2013 |
| CN | 103325339 A | 9/2013 |
| CN | 203232681 U | 10/2013 |
| CN | 103413521 A | 11/2013 |
| CN | 103456267 A | 12/2013 |
| CN | 203366702 U | 12/2013 |
| CN | 104103239 A | 10/2014 |
| JP | 2007316462 A | 12/2007 |

OTHER PUBLICATIONS

Chinese Patent Application No. 201410283087.8, Office Action dated 2015-11-13, six (6) pages, English translation, three (3) pages.

\* cited by examiner

ORGANIC LIGHT-EMITTING DIODE PIXEL CIRCUIT AND DRIVING METHOD THEREOF

This is a National Phase Application filed under 35 U.S.C. 371 as a national stage of PCT/CN2014/090803, filed Nov. 11, 2014, and claims priority benefit from Chinese Application No. 201410283087.8, filed Jun. 23, 2014, the content of each of which is hereby incorporated by reference in its entirety.

FIELD OF THE INVENTION

The present invention relates to the field of organic light-emitting diode display technology and fingerprint recognition technology, and in particular, relates to an organic light-emitting diode pixel circuit and a driving method thereof.

BACKGROUND OF THE INVENTION

An organic light-emitting diode display panel displays by relying on light emitted from an organic light-emitting diode. Each pixel unit (i.e., sub-pixel) of the organic light-emitting diode display panel has an organic light-emitting diode pixel circuit therein. The most basic structure of the organic light-emitting diode pixel circuit, as shown in FIG. 1, is consisted of a switch transistor T, a driving transistor D, a storage capacitor C, and an organic light-emitting diode OLED (i.e., 2T1C), and operates under the drive of a scanning signal Scan, a data signal Data, and a supply voltage Vdd, wherein, the driving transistor D is in a saturation state. Thus, an electric current passing through the driving transistor D (i.e., a working current $I_{oled}$ passing through the organic light-emitting diode) satisfies the following equation:

$$I_{oled} = K(V_{gs} - V_{th})^2$$

Wherein, K is a coefficient, $V_{gs}$ is a gate-source voltage of the driving transistor D, and $V_{th}$ is a threshold voltage of the driving transistor D. In a case where a source voltage is given, a gate voltage of the driving transistor D is equal to a driving voltage $V_{data}$ provided by the data signal Data for causing the organic light-emitting diode to display, while the brightness of the organic light-emitting diode OLED (i.e., content displayed by the organic light-emitting diode OLED) is determined by the working current $I_{oled}$ thereof. As a result, the brightness of the organic light-emitting diode OLED, i.e., the content displayed by the organic light-emitting diode OLED, can be controlled by adjusting the driving voltage $V_{data}$.

However, the inventor has found that there are at least the following problems in the prior art.

Firstly, the threshold voltage $V_{th}$ of the driving transistor will change gradually (i.e., the threshold voltage shifts) as time goes on, resulting in that the working current $I_{oled}$ changes unpredictably in a case where the driving voltage $V_{data}$ remains unchanged, and the display effect is affected.

In order to solve the above problem, in an existing method, a compensating circuit is added into the organic light-emitting diode pixel circuit so as to eliminate the shift of the threshold voltage. However, the compensating circuit generally includes a large number of capacitors, thin film transistors, and the like, resulting in a complicated structure and high cost of the organic light-emitting diode pixel circuit.

Meanwhile, a fingerprint recognition function is one of the common functions of an electronic device at present, and is of great significance for enhancing the security of the electronic device, expanding the application range thereof, increasing the added value thereof, and the like. However, most of the existing organic light-emitting diode display panels are not provided with fingerprint recognition capability and have a single function; or they are provide with fingerprint recognition capability, but a separate fingerprint recognition circuit (e.g. a laser fingerprint recognition circuit) is required to be added, resulting in a complicated structure and increased cost, and affected display function of the organic light-emitting diode display panel.

SUMMARY OF THE INVENTION

In view of the problem that an existing organic light-emitting diode pixel circuit has a single function or a complicated structure, the technical problem to be solved by the present invention includes providing an organic light-emitting diode pixel circuit and a driving method thereof, which can implement multiple functions such as touch control, fingerprint recognition, eliminating the shift of the threshold voltage, display, and the like, and have a simple structure and low cost.

A technical solution employed to solve the technical problem of the present invention is an organic light-emitting diode pixel circuit including:

a touch fingerprint detection module, which is configured to detect whether a touch occurs or not and whether the touch is caused by a convex portion of a fingerprint or a concave portion of the fingerprint, and send a result of the detection to a read line, under the control of a first scanning signal and a second scanning signal; and a compensation display module, which includes an organic light-emitting diode and at least one driving transistor, and is configured to eliminate a shift of a threshold voltage of the at least one driving transistor and drive the organic light-emitting diode to display under the control of at least the first scanning signal, the second scanning signal and a data signal.

Preferably, the touch fingerprint detection module includes a detecting capacitor, a first detecting transistor, a second detecting transistor, and a third detecting transistor, wherein, the detecting capacitor includes a first electrode for sensing the touch and a second electrode opposite to the first electrode, and the second electrode of the detecting capacitor is used for receiving the second scanning signal;

a gate of the first detecting transistor is used for receiving the first scanning signal, a first electrode thereof is used for receiving a reference voltage, and a second electrode thereof is connected to the first electrode of the detecting capacitor;

a gate of the second detecting transistor is connected to the first electrode of the detecting capacitor, a first electrode thereof is used for receiving the reference voltage, and a second electrode thereof is connected to a first electrode of the third detecting transistor; and a gate of the third detecting transistor is used for receiving the second scanning signal, and a second electrode thereof is connected to the read line.

Further preferably, the compensation display module includes a first storage capacitor, the organic light-emitting diode, a first driving transistor, a first switch transistor, a second switch transistor, a third switch transistor, a fourth switch transistor, and a fifth switch transistor, wherein, the first driving transistor, all of the switch transistors, and all of the detecting transistors are N-type thin film transistors, and the first storage capacitor includes a first electrode and a second electrode;

a cathode of the organic light-emitting diode is grounded;

a gate of the first driving transistor is connected to the second electrode of the first storage capacitor, and a first electrode thereof is connected to an anode of the organic light-emitting diode;

a gate of the first switch transistor is used for receiving the second scanning signal, a first electrode thereof is connected to a second electrode of the first driving transistor, and a second electrode thereof is used for receiving a supply voltage;

a gate of the second switch transistor is used for receiving the first scanning signal, a first electrode thereof is connected to the second electrode of the first storage capacitor, and a second electrode thereof is connected to the second electrode of the first driving transistor;

a gate of the third switch transistor is used for receiving the first scanning signal, a first electrode thereof is used for receiving the data signal, and a second electrode thereof is connected to the first electrode of the first storage capacitor;

a gate of the fourth switch transistor is used for receiving the second scanning signal, a first electrode thereof is connected to the first electrode of the first storage capacitor, and a second electrode thereof is connected to the anode of the organic light-emitting diode; and a gate of the fifth switch transistor is used for receiving the first scanning signal, a first electrode thereof is grounded, and a second electrode thereof is connected to the anode of the organic light-emitting diode.

Further preferably, the compensation display module includes a second storage capacitor, the organic light-emitting diode, a second driving transistor, a sixth switch transistor, a seventh switch transistor, an eighth switch transistor, and a ninth switch transistor, wherein, the second driving transistor, all of the switch transistors, and all of the detecting transistors are N-type thin film transistors, and the second storage capacitor includes a first electrode and a second electrode;

a cathode of the organic light-emitting diode is grounded;

a gate of the second driving transistor is connected to the second electrode of the second storage capacitor, and a first electrode thereof is connected to an anode of the organic light-emitting diode;

a gate of the sixth switch transistor is used for receiving the second scanning signal, a first electrode thereof is connected to a second electrode of the second driving transistor, and a second electrode thereof is used for receiving a supply voltage;

a gate of the seventh switch transistor is used for receiving the first scanning signal, a first electrode thereof is connected to the second electrode of the second storage capacitor, and a second electrode thereof is connected to the second electrode of the second driving transistor;

a gate of the eighth switch transistor is used for receiving a control signal, a first electrode thereof is used for receiving the data signal, and a second electrode thereof is connected to the first electrode of the second storage capacitor; and a gate of the ninth switch transistor is used for receiving the first scanning signal, a first electrode thereof is grounded, and a second electrode thereof is connected to the anode of the organic light-emitting diode.

Further preferably, the compensation display module includes a second storage capacitor, the organic light-emitting diode, a second driving transistor, a sixth switch transistor, a seventh switch transistor, an eighth switch transistor, and a ninth switch transistor, wherein, the second driving transistor, the sixth switch transistor, the seventh switch transistor, the ninth switch transistor, and all of the detecting transistors are N-type thin film transistors, the eighth switch transistor is a P-type thin film transistor, and the second storage capacitor includes a first electrode and a second electrode;

a cathode of the organic light-emitting diode is grounded;

a gate of the second driving transistor is connected to the second electrode of the second storage capacitor, and a first electrode thereof is connected to an anode of the organic light-emitting diode;

a gate of the sixth switch transistor is used for receiving the second scanning signal, a first electrode thereof is connected to a second electrode of the second driving transistor, and a second electrode thereof is used for receiving a supply voltage;

a gate of the seventh switch transistor is used for receiving the first scanning signal, a first electrode thereof is connected to the second electrode of the second storage capacitor, and a second electrode thereof is connected to the second electrode of the second driving transistor;

a gate of the eighth switch transistor is used for receiving the second scanning signal, a first electrode thereof is used for receiving the data signal, and a second electrode thereof is connected to the first electrode of the second storage capacitor; and a gate of the ninth switch transistor is used for receiving the first scanning signal, a first electrode thereof is grounded, and a second electrode thereof is connected to the anode of the organic light-emitting diode.

Further preferably, the compensation display module includes a second storage capacitor, the organic light-emitting diode, a second driving transistor, a sixth switch transistor, a seventh switch transistor, an eighth switch transistor, and a ninth switch transistor, wherein, the second driving transistor, the seventh switch transistor, the eighth switch transistor, the ninth switch transistor, the first detecting transistor, and the second detecting transistor are N-type thin film transistors, the sixth switch transistor and the third detecting transistor are P-type thin film transistors, and the second storage capacitor includes a first electrode and a second electrode;

a cathode of the organic light-emitting diode is grounded;

a gate of the second driving transistor is connected to the second electrode of the second storage capacitor, and a first electrode thereof is connected to an anode of the organic light-emitting diode;

a gate of the sixth switch transistor is used for receiving the second scanning signal, a first electrode thereof is connected to a second electrode of the second driving transistor, and a second electrode thereof is used for receiving a supply voltage;

a gate of the seventh switch transistor is used for receiving the first scanning signal, a first electrode thereof is connected to the second electrode of the second storage capacitor, and a second electrode thereof is connected to the second electrode of the second driving transistor;

a gate of the eighth switch transistor is used for receiving the second scanning signal, a first electrode thereof is used for receiving the data signal, and a second electrode thereof is connected to the first electrode of the second storage capacitor; and a gate of the ninth switch transistor is used for receiving the first scanning signal, a first electrode thereof is grounded, and a second electrode thereof is connected to the anode of the organic light-emitting diode.

Further preferably, the compensation display module includes a third storage capacitor, the organic light-emitting diode, a third driving transistor, a fourth driving transistor, a tenth switch transistor, an eleventh switch transistor, and a twelfth switch transistor, wherein, all of the driving transistors, all of the switch transistors, and all of the detecting transistors are N-type thin film transistors, and the third storage capacitor includes a first electrode and a second electrode, and the first electrode of the third storage capacitor is grounded;

a cathode of the organic light-emitting diode is grounded;

a gate and a second electrode of the third driving transistor are connected to the second electrode of the third storage capacitor;

a gate of the fourth driving transistor is connected to the second electrode of the third storage capacitor;

a gate of the tenth switch transistor is used for receiving a control signal, a first electrode thereof is connected to a second electrode of the fourth driving transistor, and a second electrode thereof is used for receiving a supply voltage;

a gate of the eleventh switch transistor is used for receiving the first scanning signal, a first electrode thereof is connected to the second electrode of the third driving transistor, and a second electrode thereof is connected to the second electrode of the fourth driving transistor; and a gate of the twelfth switch transistor is used for receiving the second scanning signal, a first electrode thereof is used for receiving the data signal, and a second electrode thereof is connected to a first electrode of the third driving transistor.

Further preferably, the compensation display module includes a third storage capacitor, the organic light-emitting diode, a third driving transistor, a fourth driving transistor, a tenth switch transistor, an eleventh switch transistor, and a twelfth switch transistor, wherein, all of the driving transistors, the eleventh switch transistor, the twelfth switch transistor, and all of the detecting transistors are N-type thin film transistors, the tenth switch transistor is a P-type thin film transistor, and the third storage capacitor includes a first electrode and a second electrode, and the first electrode of the third storage capacitor is grounded;

a cathode of the organic light-emitting diode is grounded;

a gate and a second electrode of the third driving transistor are connected to the second electrode of the third storage capacitor;

a gate of the fourth driving transistor is connected to the second electrode of the third storage capacitor;

a gate of the tenth switch transistor is used for receiving the second scanning signal, a first electrode thereof is connected to a second electrode of the fourth driving transistor, and a second electrode thereof is used for receiving a supply voltage;

a gate of the eleventh switch transistor is used for receiving the first scanning signal, a first electrode thereof is connected to the second electrode of the third driving transistor, and a second electrode thereof is connected to the second electrode of the fourth driving transistor; and a gate of the twelfth switch transistor is used for receiving the second scanning signal, a first electrode thereof is used for receiving the data signal, and a second electrode thereof is connected to a first electrode of the third driving transistor.

A technical solution employed to solve the technical problem of the present invention is a driving method of the above organic light-emitting diode pixel circuit, the driving method including:

resetting and charging both the touch fingerprint detection module and the compensation display module;

causing the compensation display module to obtain a correct compensation voltage;

causing the touch fingerprint detection module to detect a touch and output a result of the detection; and causing the compensation display module to emit light and display.

Preferably, the driving method includes:

in a resetting stage, setting both the first scanning signal and the second scanning signal to a high level;

in a compensating stage, setting the first scanning signal to a high level, setting the second scanning signal to a low level, and using the data signal as a driving voltage for driving the organic light-emitting diode to display; and in a reading and displaying stage, setting the first scanning signal to a low level, and setting the second scanning signal to a high level.

Further preferably, between the compensating stage and the reading and displaying stage, the driving method further includes:

a buffering stage, in which both the first scanning signal and the second scanning signal are set to a low level.

Preferably, the driving method includes:

in a resetting stage, setting both the first scanning signal and the second scanning signal to a high level, and setting the control signal to a low level;

in a compensating stage, setting the first scanning signal to a high level, setting the second scanning signal to a low level, and setting the control signal to a high level;

in a writing stage, setting the first scanning signal to a low level, setting the second scanning signal to a low level, setting the control signal to a high level, and using the data signal as a driving voltage for driving the organic light-emitting diode to display; and in a reading and displaying stage, setting the first scanning signal to a low level, setting the second scanning signal to a high level, and setting the control signal to a low level.

Preferably, the driving method includes:

in a resetting stage, setting both the first scanning signal and the second scanning signal to a high level;

in a compensating stage, setting the first scanning signal to a high level, and setting the second scanning signal to a low level;

in a writing stage, setting the first scanning signal to a low level, setting the second scanning signal to a low level, and using the data signal as a driving voltage for driving the organic light-emitting diode to display; and in a reading and displaying stage, setting the first scanning signal to a low level, and setting the second scanning signal to a high level.

Preferably, the driving method includes:

in a resetting stage, setting the first scanning signal to a high level, and setting the second scanning signal to a low level;

in a compensating stage, setting the first scanning signal to a high level, and setting the second scanning signal to a high level;

in a writing stage, setting the first scanning signal to a low level, setting the second scanning signal to a high level, and using the data signal as a driving voltage for driving the organic light-emitting diode to display; and in a reading and displaying stage, setting both the first scanning signal and the second scanning signal to a low level.

Preferably, the driving method includes:

in a resetting stage, setting the first scanning signal to a high level, setting the second scanning signal to a low level, and setting the control signal to a high level;

in a reading and compensating stage, setting the first scanning signal to a low level, setting the second scanning signal to a high level, setting the control signal to a low level, and using the data signal as a driving voltage for driving the organic light-emitting diode to display; and in a displaying stage, setting both the first scanning signal and the second scanning signal to a low level, and setting the control signal to a high level.

Preferably, the driving method includes:

in a resetting stage, setting the first scanning signal to a high level, and setting the second scanning signal to a low level;

in a reading and compensating stage, setting the first scanning signal to a low level, setting the second scanning signal to a high level, and using the data signal as a driving voltage for driving the organic light-emitting diode to display; and in a displaying stage, setting both the first scanning signal and the second scanning signal to a low level.

Here, each of the "transistors" refers to a thin film transistor, which is a commonly used electronic device. Each thin film transistor includes two electrodes connected by an active region, namely, a source and a drain, wherein an electrode into which an electric current flows is the source, and an electrode from which an electric current flows is the drain. Since the flow directions of the electric current of many transistors are different at different time in the present invention, the two electrodes of a transistor are just referred to as a first electrode and a second electrode, without distinguishing source and drain. Thus, the first electrode and the second electrode merely used for distinguishing between the two electrodes of a transistor, and specific distinction therebetween is determined by their respective connections with other components. It is not necessary that the first electrode and the second electrode correspond to the source and the drain.

The organic light-emitting diode pixel circuit according to the present invention includes a touch fingerprint detection module, which can detect whether a touch occurs or not so as to implement a touch control function; meanwhile the touch fingerprint detection module can also detect whether the touch is caused by a convex portion of a fingerprint or a concave portion of the fingerprint, as such, a fingerprint of a toucher can be obtained by combining the detection results of a plurality of organic light-emitting diode pixel circuits, thus fingerprint recognition is implemented. In addition, the organic light-emitting diode pixel circuit further includes a compensation display module, which can drive an organic light-emitting diode to display while eliminating a shift of a threshold voltage of a driving transistor, thus a good display effect is achieved. In conclusion, the organic light-emitting diode pixel circuit according to the present invention implements multiple functions such as touch control, fingerprint recognition, eliminating the shift of the threshold voltage, display, and the like at the same time, and has not only powerful functions but also a simple structure and low cost.

DESCRIPTION OF REFERENCE SIGNS

Figure 1:
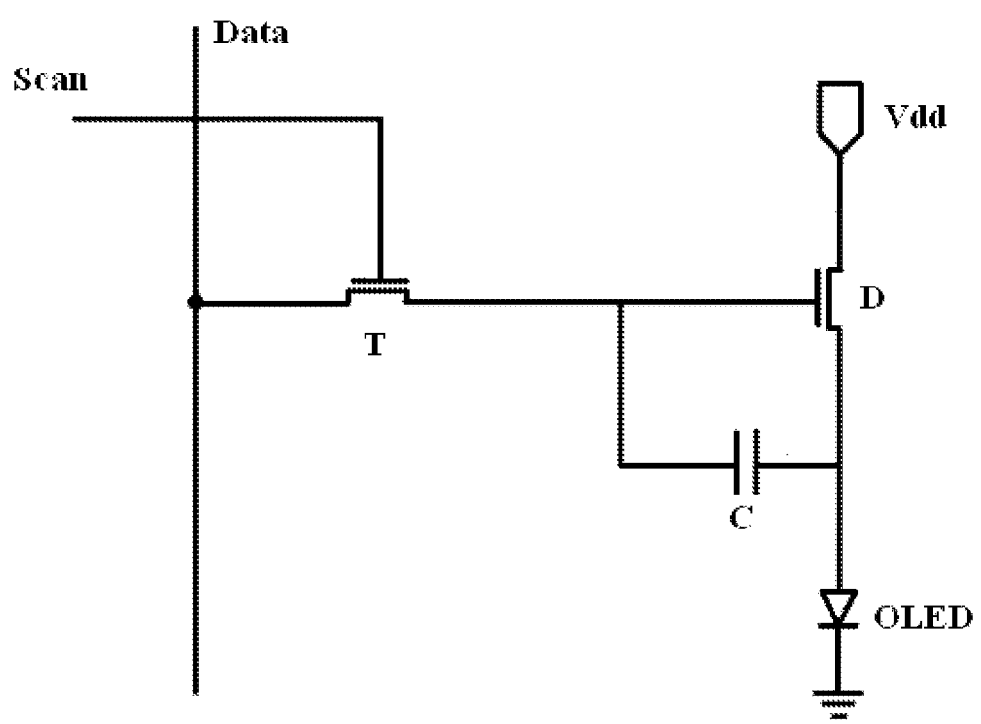
FIG. 1 is a schematic diagram showing an existing organic light-emitting diode pixel circuit.

M1—first detecting transistor; M2—second detecting transistor; M3—third detecting transistor; T—switch transistor; T1—first switch transistor; T2—second switch transistor; T3—third switch transistor; T4—fourth switch transistor; T5—fifth switch transistor; T6—sixth switch transistor; T7—seventh switch transistor; T8—eighth switch transistor; T9—ninth switch transistor; T10—tenth switch transistor; T11—eleventh switch transistor; T12—twelfth switch transistor; D—driving transistor; D1—first driving transistor; D2—second driving transistor; D3—third driving transistor; D4—fourth driving transistor; C—storage capacitor; Cj—detecting capacitor; C1—first storage capacitor; C2—second storage capacitor; C3—third storage capacitor; Cf—touch capacitance; OLED—organic light-emitting diode; Scan—scanning signal; Scan1—first scanning signal; Scan2—second scanning signal; Data—data signal; Read—read line; Vdd—supply voltage; Vc—reference voltage; EM—control signal; 9—finger; 91—convex portion of a fingerprint; and 92—concave portion of a fingerprint.

DETAILED DESCRIPTION OF THE EMBODIMENTS

To enable a person skilled in the art to better understand the technical solutions of the present invention, the present invention will be further described in detail below with reference to the drawings and specific embodiments.

First Embodiment

As shown in FIGS. 2, 3, 14 and 15, the present embodiment provides an organic light-emitting diode pixel circuit and a driving method thereof.

Here, the organic light-emitting diode pixel circuit refers to a circuit in a pixel unit (i.e., a sub-pixel) of an organic light-emitting diode display panel. Specifically, for the organic light-emitting diode display panel, all pixel units thereof may use the organic light-emitting diode pixel circuit according to the present invention; but preferably, only a part of pixel units thereof use the organic light-emitting diode pixel circuit according to the present invention and the remaining pixel units thereof use the existing pixel circuit without a touch function and a fingerprint recognition function, comprehensively considering the occupied space, preparation difficulty, cost, and the like. For example, in every six pixel units arranged in two rows and three columns (i.e., 2×3 pixel units), only one pixel unit employs the organic light-emitting diode pixel circuit according to the present invention. The reasons for this is that, since the size of a sub-pixel of the organic light-emitting diode display panel is generally very small, the accuracy is sufficient even if only one of a plurality of sub-pixels has a touch function and a fingerprint recognition function.

Specifically, the organic light-emitting diode pixel circuit according to the present embodiment includes:

a touch fingerprint detection module, which is configured to detect whether a touch occurs or not and whether the touch is caused by a convex portion 91 of a fingerprint or a concave portion 92 of the fingerprint, and send a result of the detection to a read line Read, under the control of a first scanning signal Scan1 and a second scanning signal Scan2; and a compensation display module, which includes an organic light-emitting diode OLED and at least one driving transistor, and is configured to eliminate a shift of a threshold voltage of the at least one driving transistor and drive the organic light-emitting diode OLED to display, under the control of at least the first scanning signal Scan1, the second scanning signal Scan2, and a data signal Data.

The organic light-emitting diode pixel circuit according to the present embodiment includes the touch fingerprint detection module, which can detect whether a touch occurs or not so as to implement a touch function; meanwhile, the touch fingerprint detection module can also detect whether the touch is caused by the convex portion 91 of the fingerprint or the concave portion 92 of the fingerprint, as such, a fingerprint of a toucher can be obtained by combining the detection results of a plurality of organic light-emitting diode pixel circuits, thus fingerprint recognition is implemented. In addition, the organic light-emitting diode pixel circuit further includes the compensation display module, which can drive the organic light-emitting diode OLED to display while eliminating a shift of a threshold voltage of a driving transistor, thus a good display effect is achieved. In conclusion, the organic light-emitting diode pixel circuit according to the present embodiment implements multiple functions such as touch control, fingerprint recognition, eliminating the shift of the threshold voltage, display, and the like at the same time, and has not only powerful functions but also a simple structure and low cost.

Figure 2:
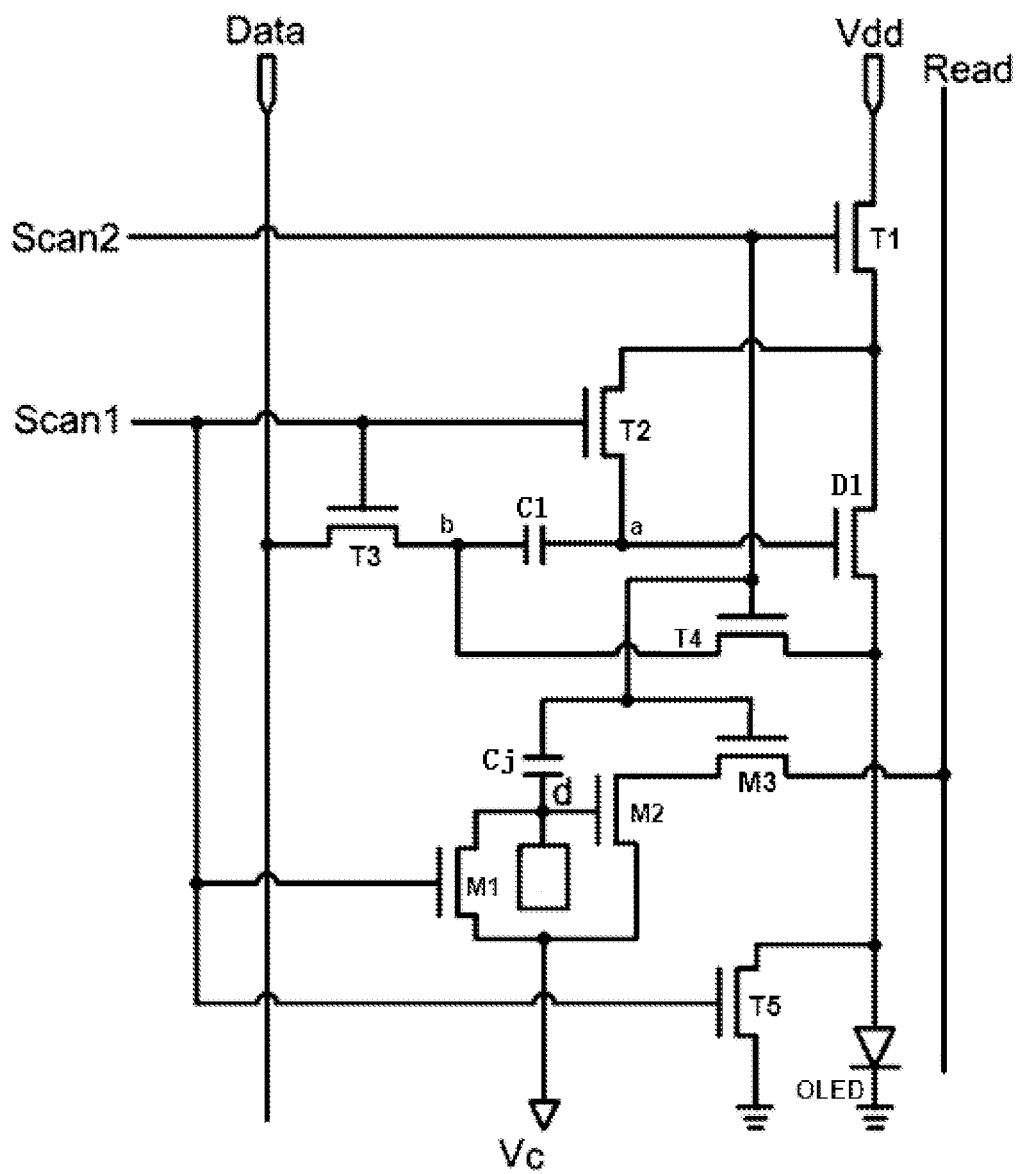
FIG. 2 is a schematic diagram showing an organic light-emitting diode pixel circuit according to a first embodiment of the present invention.

Referring to FIG. 2, the organic light-emitting diode pixel circuit according to the present embodiment will be described in detail below.

The touch fingerprint detection module includes a detecting capacitor Cj, a first detecting transistor M1, a second detecting transistor M2, and a third detecting transistor M3, wherein all of the transistors are N-type thin film transistors.

The detecting capacitor Cj includes a first electrode (point d in the figure) for sensing a touch and a second electrode opposite to the first electrode, and the second electrode of the detecting capacitor Cj is used for receiving the second scanning signal Scan2.

A gate of the first detecting transistor M1 is used for receiving the first scanning signal M1, a first electrode thereof is used for receiving a reference voltage Vc, and a second electrode thereof is connected to the first electrode of the detecting capacitor Cj.

A gate of the second detecting transistor M2 is connected to the first electrode of the detecting capacitor Cj, a first electrode thereof is used for receiving the reference voltage Vc, and a second electrode thereof is connected to a first electrode of the third detecting transistor M3.

A gate of the third detecting transistor M3 is used for receiving the second scanning signal Scan2, and a second electrode thereof is connected to the read line Read.

Correspondingly, the compensation display module of the organic light-emitting diode pixel circuit includes a first storage capacitor C1, the organic light-emitting diode OLED, a first driving transistor D1, a first switch transistor T1, a second switch transistor T2, a third switch transistor T3, a fourth switch transistor T4, and a fifth switch transistor T5, wherein, all of the transistors are also N-type thin film transistors, and the first storage capacitor C1 includes a first electrode and a second electrode;

a cathode of the organic light-emitting diode OLED is grounded;

a gate of the first driving transistor D1 is connected to the second electrode (point a in the figure) of the first storage capacitor C1, and a first electrode thereof is connected to an anode of the organic light-emitting diode OLED;

a gate of the first switch transistor T1 is used for receiving the second scanning signal Scan2, a first electrode thereof is connected to a second electrode of the first driving transistor D1, and a second electrode thereof is used for receiving a supply voltage Vdd;

a gate of the second switch transistor T2 is used for receiving the first scanning signal Scan1, a first electrode thereof is connected to the second electrode of the first storage capacitor C1, and a second electrode thereof is connected to the second electrode of the first driving transistor D1;

a gate of the third switch transistor T3 is used for receiving the first scanning signal Scan1, a first electrode thereof is used for receiving the data signal Data, and a second electrode thereof is connected to the first electrode (point b in the figure) of the first storage capacitor C1;

a gate of the fourth switch transistor T4 is used for receiving the second scanning signal Scan2, a first electrode thereof is connected to the first electrode of the first storage capacitor C1, and a second electrode thereof is connected to the anode of the organic light-emitting diode OLED; and a gate of the fifth switch transistor T5 is used for receiving the first scanning signal Scan1, a first electrode thereof is grounded, and a second electrode thereof is connected to the anode of the organic light-emitting diode OLED.

Correspondingly, a driving method of the organic light-emitting diode pixel circuit includes steps of: detecting whether a touch occurs or not and whether the touch is caused by a convex portion 91 of a fingerprint or a concave portion 92 of the fingerprint, and sending a result of the detection to the read line Read, by using the touch fingerprint detection module; eliminating a shift of a threshold voltage of the at least one driving transistor and driving the organic light-emitting diode OLED to display, by using the compensation display module.

The operating principle of the organic light-emitting diode pixel circuit according to the present embodiment will be explained in conjunction with a driving method of the organic light-emitting diode pixel circuit. A driving method of the organic light-emitting diode pixel circuit according to the present invention includes steps of:

resetting and charging both the touch fingerprint detection module and the compensation display module;

causing the compensation display module to obtain a correct compensation voltage;

causing the touch fingerprint detection module to detect a touch and output a result of the detection; and causing the compensation display module to emit light and display.

It should be noted that, the above steps are not necessarily performed separately, and two or more of the above steps may be performed concurrently, which is not limited in the present invention, as long as the above steps can be implemented finally. Detailed description thereof will be made with reference to specific embodiments.

Figure 3:
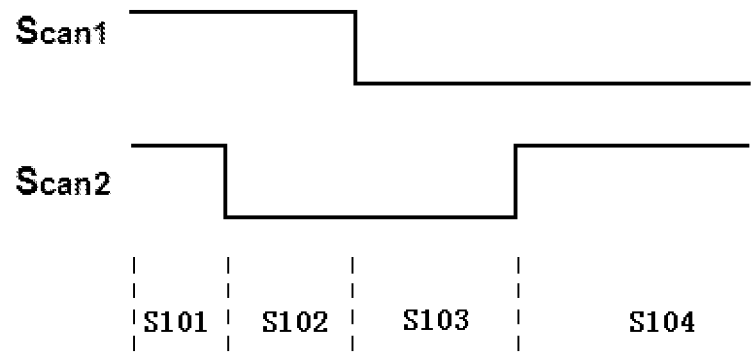
FIG. 3 is a schematic diagram showing a drive timing of the organic light-emitting diode pixel circuit as shown in FIG. 2.

As shown in FIG. 3, the operation of the organic light-emitting diode pixel circuit according to the present embodiment includes a resetting stage, a compensating stage, a buffering stage, and a reading and displaying stage. The driving method of the organic light-emitting diode pixel circuit specifically includes the following steps.

At Step S101: in the resetting stage, both the first scanning signal Scan1 and the second scanning signal Scan2 are set to a high level, so that both the touch fingerprint detection module and the compensation display module are reset and charged.

Here, since both the first scanning signal Scan1 and the second scanning signal Scan2 are at a high level, the first detecting transistor M1, the third detecting transistor M3, the first driving transistor D1, the first switch transistor T1, the second switch transistor T2, the third switch transistor T3, the fourth switch transistor T4, and the fifth switch transistor T5 are all turned on.

In the touch fingerprint detection module, the first electrode (point d in the figure) of the detecting capacitor Cj is charged to the reference voltage Vc via the first detecting transistor M1, the second electrode thereof is charged to the high level of the second scanning signal Scan2, and thus, the detecting capacitor Cj is reset.

In FIG. 2, the first electrode of the detecting capacitor Cj is connected to a separate pole piece, which has a relatively large area and thus can sense a touch sensitively when the touch occurs. Of course, it should be noted that, it is also feasible to directly use the first electrode of the detecting capacitor Cj to sense a touch (i.e., the pole piece in the figure may be integrated into the first electrode of the detecting capacitor Cj). In conclusion, it is feasible as long as the first electrode of the detecting capacitor Cj can sense a touch when the touch occurs, and detailed description of a specific structure thereof is omitted herein.

In the compensation display module, both the second electrode of the first storage capacitor C1 and the gate (point a in the figure) of the first driving transistor D1 are charged to the supply voltage Vdd.

Meanwhile, the data signal Data may be used as a driving voltage $V_{data}$ for driving the organic light-emitting diode OLED to display, thus the first electrode (point b in the figure) of the first storage capacitor C1 is charged to the driving voltage $V_{data}$ via the third switch transistor T3. Of course, the driving voltage $V_{data}$ may be input in the next step.

At Step S102: in the compensating stage, the first scanning signal Scan1 is set to a high level, the second scanning signal Scan2 is set to a low level, and the data signal Data is used as the driving voltage $V_{data}$ for driving the organic light-emitting diode OLED to display, so that the compensation display module obtains a correct compensation voltage.

At this time, the second scanning signal Scan2 is changed to a low level, and thus, the first switch transistor T1, the fourth switch transistor T4, and the third detecting transistor M3 are all turned off.

The state of the touch fingerprint detection module does not change substantially.

However, the first electrode (point b in the figure) of the first storage capacitor C1 of the compensation display module is charged to or maintains at the driving voltage $V_{data}$, the second electrode (point a in the figure) thereof discharges via the second switch transistor T2, the first driving transistor D1, and the fifth switch transistor T5, and when the voltage thereof is reduced to a threshold voltage $V_{th1}$ of the first driving transistor D1, the first driving transistor D1 is turned off and the discharge stops. In this case, a difference between voltages at the two ends (the points b and a) of the first storage capacitor C1 is ($V_{data}-V_{th1}$).

In the Steps S101 and S102, since the fifth switch transistor T5 is always turned on, electric current will pass through the fifth switch transistor T5 but not the organic light-emitting diode OLED, and thus, the organic light-emitting diode OLED does not emit light, which, on one hand, extends a service life of the organic light-emitting diode OLED, and on the other hand, ensures that the organic light-emitting diode OLED will not emit light incorrectly.

At Step S103: optionally, in the buffering stage, the first scanning signal Scan1 is set to a low level, and the second scanning signal Scan2 is set to a low level, so that the voltage of the compensation display module is stable.

At this point, since the first scanning signal Scan1 is also changed to a low level, every transistor is turned off.

The main function of the present step is to make a voltage across the two ends (the points a and b) of the first storage capacitor C1 of the compensation display module stable. Of course, it should be noted that it is also feasible if the present step is not performed.

Further, from the present step, the third switch transistor T3 is turned off, and thus the data signal Data cannot be written into the compensation display module any longer and may be used to provide a driving voltage required for the next row of pixel units. At the same time, the fifth switch transistor T5 is also turned off from the present step, thus the organic light-emitting diode OLED is ready for displaying.

At Step S104: in the reading and displaying stage, the first scanning signal Scan1 is set to a low level, and the second scanning signal Scan2 is set to a high level, so that the touch fingerprint detection module can detect a touch and output a result of the detection through the read line Read, and the compensation display module can display at the same time.

In the present step, the second scanning signal Scan2 is changed to a high level, and thus the first switch transistor T1, the fourth switch transistor T4, and the third detecting transistor M3 are turned on again.

Figure 14:
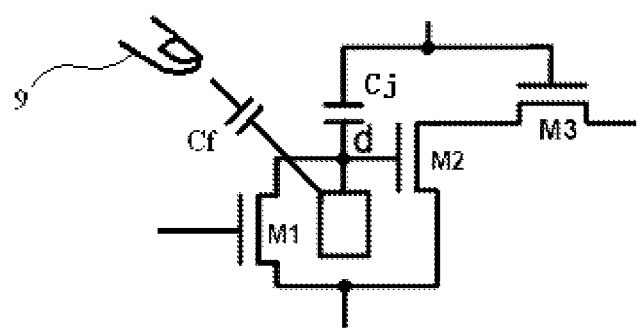
FIG. 14 is a diagram showing the principle of detecting a touch by a touch fingerprint detection module of the organic light-emitting diode pixel circuit of the present invention.

For the touch fingerprint detection module, the first detecting transistor M1 thereof is turned off, and the detecting capacitor Cj no longer discharges. When a touch occurs, touch capacitance Cf will be formed between a finger 9 performing the touch and the first electrode of the detecting capacitor Cj, and the effect thereof is as shown in FIG. 14, which is equivalent to the parallel connection of the touch capacitance Cf and the capacitance of the detecting capacitor Cj. As a result, the charges on the first electrode of the detecting capacitor Cj will be redistributed according to a ratio of the touch capacitance Cf to the capacitance of the detecting capacitor Cj. Accordingly, a voltage applied to the gate of the second detecting transistor M2 will change, and thus a detection current flowing through the second detecting transistor M2 will also change (e.g., there is electric current and there is no electric current, or a value of the electric current changes). The detection current flows through the third detecting transistor M3, and then is output by the read line Read to a corresponding detection chip, which can determine which pixel unit is touched according to the detection current, i.e., a touch position is determined, thereby implementing touch control.

Figure 15:
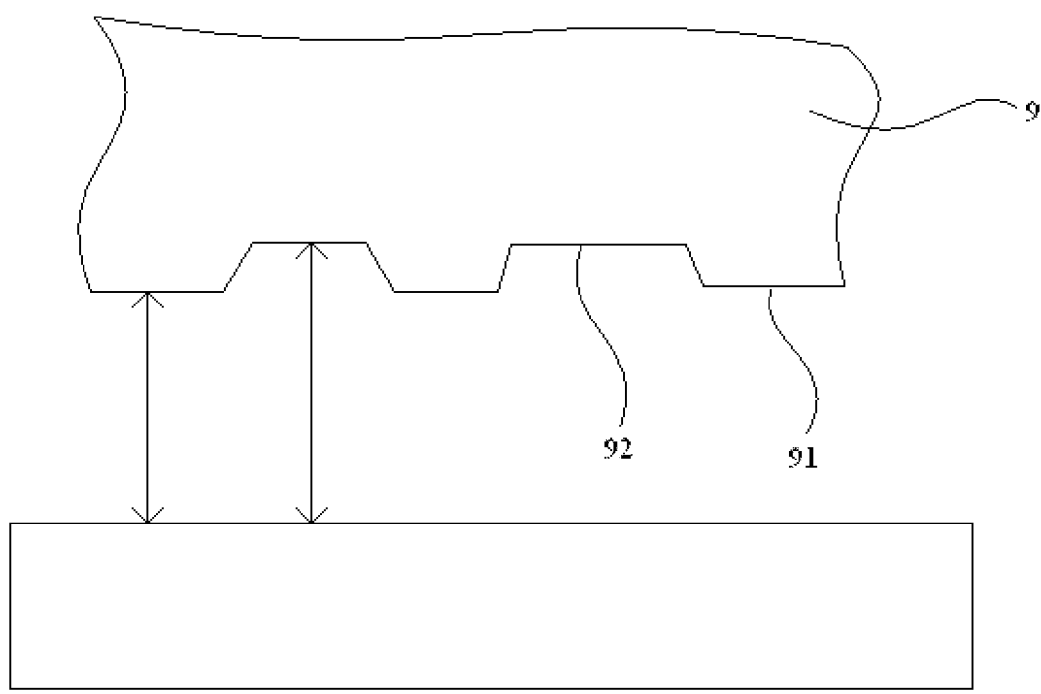
FIG. 15 is a diagram showing the principle of detecting a concave portion and a convex portion of a fingerprint by the touch fingerprint detection module of the organic light-emitting diode pixel circuit of the present invention.

Correspondingly, as shown in FIG. 15, a fingerprint actually means the concave portions and the convex portions of the surface of the finger 9. Obviously, when a touch is performed by a concave portion 92 and a convex portion 91, a distance between the concave portion 92 and the first electrode of the detecting capacitor Cj differs from that between the convex portion 91 and the first electrode of the detecting capacitor Cj. Accordingly, values of the resultant touch capacitances Cf are different, the value of the touch capacitance Cf corresponding to the concave portion 92 is smaller, and the value of the touch capacitance Cf corresponding to the convex portion 91 is larger. Further, when a touch is performed by the concave portion 92 and the convex portion 91, voltages applied to the gate of the second detecting transistor M2 are different, resulting in different detection currents. As such, by comparing the detection currents of pixel units in a region where the touch occurs, it can be determined that which pixel units correspond to the concave portion 92 and which pixel units correspond to the convex portion 91. Then the pattern of fingerprint on the finger 9 performing the touch can be obtained according to the positions of these pixel units, thereby implementing fingerprint recognition.

Accordingly, in the present step, the first switch transistor T1 is turned on, and the organic light-emitting diode OLED starts to emit light (i.e., starts to display), and a voltage at the anode of the organic light-emitting diode OLED jumps to a light-emitting voltage $V_{oled}$ of the organic light-emitting diode OLED. Accordingly, the first electrode of the first driving transistor D1 is also changed to the light-emitting voltage $V_{oled}$. At this time, the fourth switch transistor T4 is turned on, thus a voltage at the first electrode (point b in the figure) of the first storage capacitor C1 is also changed to the light-emitting voltage $V_{oled}$. Since the first storage capacitor C1 cannot discharge, a voltage at the second electrode (point a in the figure) is boosted up to $(V_{oled}+V_{th1}-V_{data})$, that is, a voltage at the gate of the first driving transistor D1 is changed to $(V_{oled}+V_{th1}-V_{data})$. Since the first driving transistor D1 is in a saturation state, an electric current thereof (i.e., a working current $I_{oled}$ passing through the organic light-emitting diode OLED) satisfies the following equation (where K is a coefficient):

$$I_{oled} = K(V_{gs} - V_{th1})^2$$
$$= K[(V_{oled} + V_{th1} - V_{data}) - V_{oled} - V_{th1}]^2$$
$$= K(V_{data})^2$$

It can be seen that, the working current $I_{oled}$ when the organic light-emitting diode OLED is emitting light is independent from the threshold voltage of the driving transistor, thus an influence of a shift of the threshold voltage of the driving transistor on the emission brightness of the organic light-emitting diode OLED can be avoided, thereby achieving a better display effect.

When display of the current frame of image is completed, the process is returned to the Step S101 to start displaying the next frame of image.

Second Embodiment

The present embodiment provides an organic light-emitting diode pixel circuit and a driving method thereof.

The organic light-emitting diode pixel circuit according to the present embodiment is similar to that according to the first embodiment, and also includes a touch fingerprint detection module and a compensation display module, wherein the touch fingerprint detection module of the present embodiment has the same structure as that in the first embodiment, and these two embodiments differ from each other only in that the compensation display modules thereof have different structures.

Figure 4:
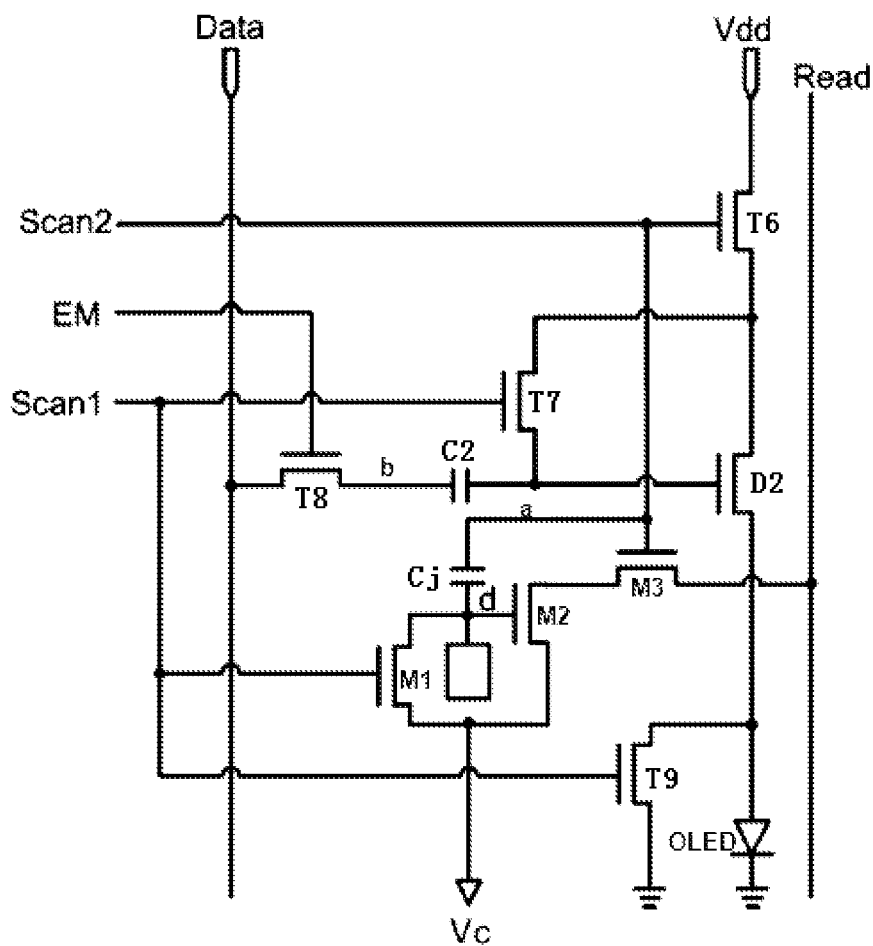
FIG. 4 is a schematic diagram showing an organic light-emitting diode pixel circuit according to a second embodiment of the present invention.

Referring to FIG. 4, the organic light-emitting diode pixel circuit (mainly the structure of the compensation display module) according to the present embodiment will be described in detail below.

Specifically, the compensation display module includes a second storage capacitor C2, an organic light-emitting diode OLED, a second driving transistor D2, a sixth switch transistor T6, a seventh switch transistor T7, an eighth switch transistor T8, and a ninth switch transistor T9, wherein, all of the transistors are N-type thin film transistors, and the second storage capacitor C2 includes a first electrode and a second electrode;

a cathode of the organic light-emitting diode OLED is grounded;

a gate of the second driving transistor D2 is connected to the second electrode (point A in the figure) of the second storage capacitor C2, and a first electrode thereof is connected to an anode of the organic light-emitting diode OLED;

a gate of the sixth switch transistor T6 is used for receiving the second scanning signal Scan2, a first electrode thereof is connected to a second electrode of the second driving transistor D2, and a second electrode thereof is used for receiving a supply voltage Vdd;

a gate of the seventh switch transistor T7 is used for receiving the first scanning signal Scan1, a first electrode thereof is connected to the second electrode of the second storage capacitor C2, and a second electrode thereof is connected to the second electrode of the second driving transistor D2;

a gate of the eighth switch transistor T8 is used for receiving a control signal EM, a first electrode thereof is used for receiving the data signal Data, and a second electrode thereof is connected to the first electrode (point b in the figure) of the second storage capacitor C2; and a gate of the ninth switch transistor T9 is used for receiving the first scanning signal Scan1, a first electrode thereof is grounded, and a second electrode thereof is connected to the anode of the organic light-emitting diode OLED.

Figure 5:
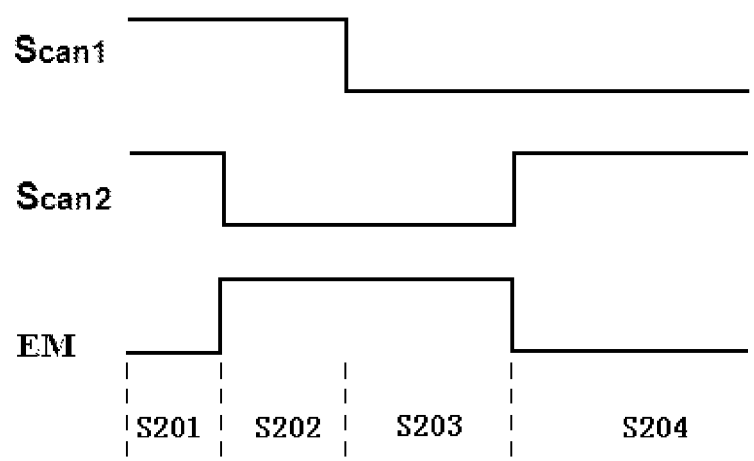
FIG. 5 is a schematic diagram showing a drive timing of the organic light-emitting diode pixel circuit as shown in FIG. 4.

Referring to FIG. 5, the operation principle of the above organic light-emitting diode pixel circuit will be explained in conjunction with the driving method thereof. The operation of the organic light-emitting diode pixel circuit includes a resetting stage, a compensating stage, a writing stage, and a reading and displaying stage. The driving method thereof specifically includes the following steps.

At Step S201: in the resetting stage, both the first scanning signal Scan1 and the second scanning signal Scan2 are set to a high level, and the control signal EM is set to a low level, so that both the touch fingerprint detection module and the compensation display module are reset and charged.

Here, the first detecting transistor M1, the third detecting transistor M3, the second driving transistor D2, the sixth switch transistor T6, the seventh switch transistor T7, and the ninth switch transistor T9 are all turned on, but the eighth switch transistor T8 is turned off.

In the touch fingerprint detection module, the first electrode (point d in the figure) of the detecting capacitor Cj is charged to the reference voltage Vc via the first detecting transistor M1, and the second electrode thereof is charged to the high level of the second scanning signal Scan2, and thus, the detecting capacitor Cj is reset.

In the compensation display module, the second electrode (point a in the figure) of the second storage capacitor C2 is charged to the supply voltage Vdd via the sixth switch transistor T6 and the seventh switch transistor T7.

At Step S202: in the compensating stage, the first scanning signal Scan1 is set to a high level, the second scanning signal Scan2 is set to a low level, and the control signal EM is set to a high level, so that the compensation display module obtains a correct compensation voltage.

At this time, since the second scanning signal Scan2 is changed to a low level and the control signal EM is changed to a high level, the sixth switch transistor T6 and the third detecting transistor M3 are turned off, but the eighth switch transistor T8 is turned on.

At this time, the state of the touch fingerprint detection module does not change substantially.

However, the first electrode (point b in the figure) of the second storage capacitor C2 of the compensation display module is charged to a voltage $V_p$ (which may be zero or any other value) of the data signal Data, the second electrode (point a in the figure) thereof discharges via the seventh switch transistor T7, the second driving transistor D2, and the ninth switch transistor T9, when a voltage thereof is reduced to a threshold voltage $V_{th2}$ of the second driving transistor D2, the second driving transistor D2 is turned off, and the discharge stops. A difference between voltages at the two ends (the points b and a) of the second storage capacitor C2 is $(V_p - V_{th2})$.

At Step S203: in the writing stage, the first scanning signal Scan1 is set to a low level, the second scanning signal Scan2 is set to a low level, the control signal EM is set to a high level, and the data signal Data is used as a driving voltage $V_{data}$ for driving the organic light-emitting diode OLED to display, so that the compensation display module is charged to a correct voltage.

At this time, since the first scanning signal Scan1 is changed to a low level, all of the transistors except for the eighth switch transistor T8 are turned off.

At this time, the state of the touch fingerprint detection module does not change substantially.

However, in the compensation display module, the data signal Data causes the voltage at the first electrode (point b in the figure) of the second storage capacitor C2 to change from $V_p$ to $V_{data}$ via the eighth switch transistor T8. At this time, since the second storage capacitor C2 cannot discharge, the voltage at the second electrode (point a in the figure) thereof is boosted up to $(V_{th2} + V_{data} - V_p)$.

At Step S204: in the reading and displaying stage, the first scanning signal Scan1 is set to a low level, the second scanning signal Scan2 is set to a high level, and the control signal EM is set to a low level, so that the touch fingerprint detection module outputs its detection result, and the compensation display module emits light and displays.

At this time, the third detecting transistor M3 is turned on, thus the detection result of the touch fingerprint detection module can be transmitted to the read line Read via the third detecting transistor M3, so as to perform touch control and fingerprint recognition. The specific action principle and process are the same as those in the reading and displaying stage in the first embodiment, thus detailed description thereof is omitted herein.

In the compensation display module, the eighth switch transistor T8 is turned off, thus the data signal Data cannot be written in any longer and may provides a driving signal for other pixel units.

At the same time, the ninth switch transistor T9 is turned off, the sixth switch transistor T6 is turned on, thus the organic light-emitting diode OLED starts to emit light (i.e., starts to display), a voltage at the anode thereof jumps to the light-emitting voltage $V_{oled}$ of the organic light-emitting diode OLED. Accordingly, a voltage at the first electrode of the second driving transistor D2 is also changed to the light-emitting voltage $V_{oled}$. Since the second driving transistor D2 is in a saturation state, an electric current thereof (i.e., a working current $I_{oled}$ passing through the organic light-emitting diode OLED) satisfies the following equation (where K is a coefficient):

$$I_{oled} = K(V_{gs} - V_{th2})^2$$
$$= K[(V_{th2} + V_{data} - V_p) - V_{oled} - V_{th2}]^2$$
$$= K(V_{data} - V_p - V_{oled})^2$$

It can be seen that, the working current $I_{oled}$ when the organic light-emitting diode OLED is emitting light is independent from the threshold voltage of the driving transistor, thus an influence of a shift of the threshold voltage of the driving transistor on the emission brightness of the organic light-emitting diode OLED can be avoided, thereby achieving a better display effect.

Obviously, since the working current $I_{oled}$ in this case is still related to the voltage $V_p$, an influence caused by the voltage $V_p$ should be taken into account when a specific value of the driving voltage $V_{data}$ is set.

When display of the current frame of image is completed, the process is returned to the Step S201 to start displaying the next frame of image.

Preferably, various modifications may be made to the organic light-emitting diode pixel circuit and the driving method thereof according to the present embodiment.

For example, it can be seen from the above driving method that, in the organic light-emitting diode pixel circuit according to the present embodiment, the state of the eighth switch transistor T8 is always opposite to that of the sixth switch transistor T6 controlled by the second scanning signal Scan2, thus the eighth switch transistor T8 needs to be controlled by the separate control signal EM when it is an N-type thin film transistor as the sixth switch transistor T6 is.

Figure 6:
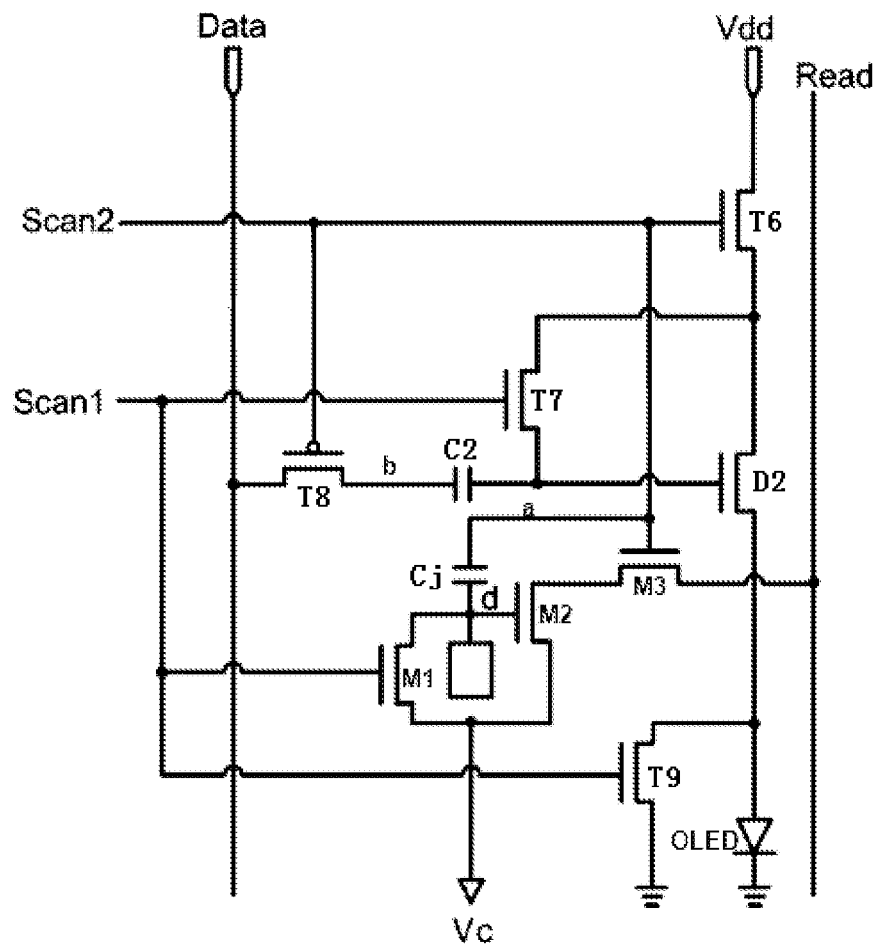
FIG. 6 is a schematic diagram showing another organic light-emitting diode pixel circuit according to the second embodiment of the present invention.
Figure 7:
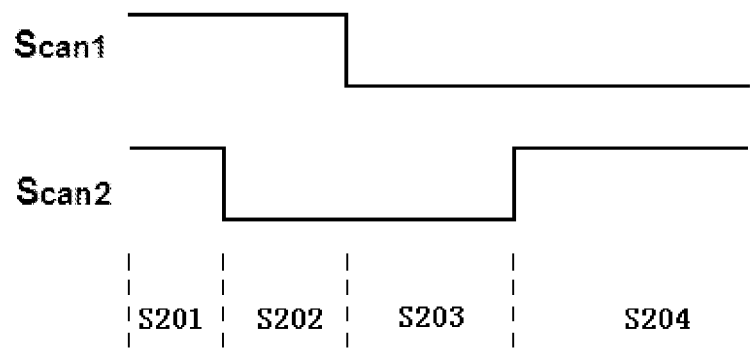
FIG. 7 is a schematic diagram showing a drive timing of the organic light-emitting diode pixel circuit as shown in FIG. 6.

Thus, preferably, as shown in FIG. 6, the eighth switch transistor T8 is a P-type thin film transistor instead, and the gate thereof is used for receiving the second scanning signal Scan2 instead. As such, the control signal EM can be omitted without changing other structures (the types of the transistors, the connection of the circuit, and the like), thereby simplifying the structure of the circuit. Of course, since the control signal EM is absent in this case, the timing diagram of the driving signals is changed to that shown in FIG. 7, in which the control signal EM is absent.

Figure 8:
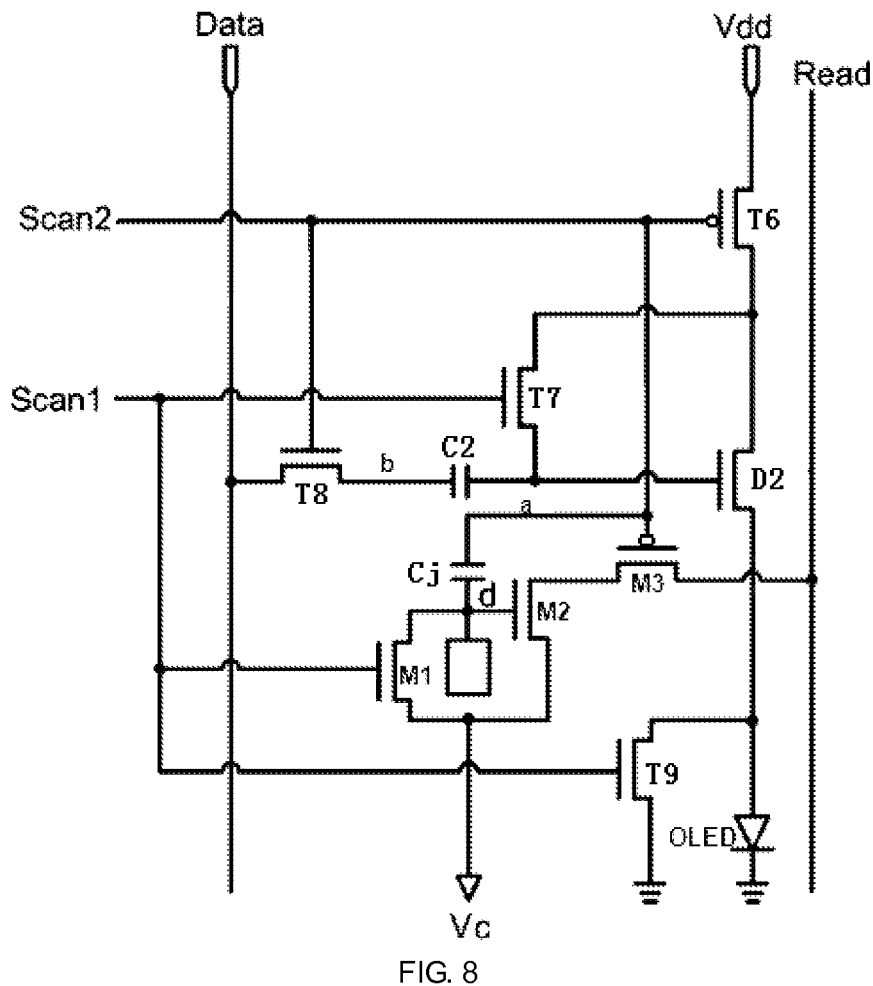
FIG. 8 is a schematic diagram showing still another organic light-emitting diode pixel circuit according to the second embodiment of the present invention.
Figure 9:
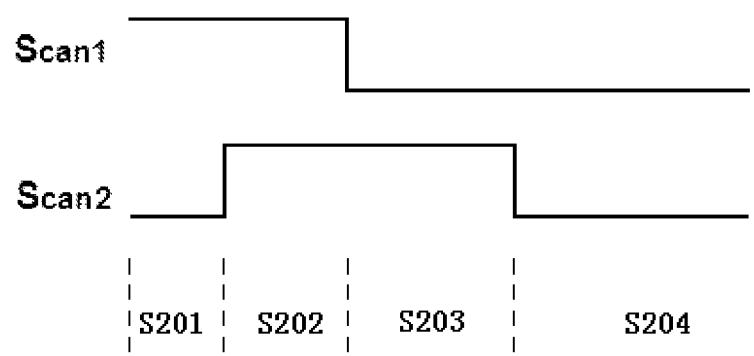
FIG. 9 is a schematic diagram showing a drive timing of the organic light-emitting diode pixel circuit as shown in FIG. 8.

Alternatively, as shown in FIG. 8, it is also feasible that, the eighth switch transistor T8 is used for receiving the second scanning signal Scan2 but it is still an N-type thin film transistor, while the sixth switch transistor T6 and the third detecting transistor M3 which are also used for receiving the second scanning signal Scan2 are P-type thin film transistors instead. At the same time, the timing diagram of the driving signals is changed to that shown in FIG. 9, that is, the high and low levels of the second scanning signal Scan2 are completely reversed, and in this way, the control signal EM can also be omitted.

In should be understood that, the above two implementations just make some changes to some structures in the organic light-emitting diode pixel circuit and the driving timing thereof. However, in a driving process, the on-off state of each of the transistors does not change, thus detailed description of the specific driving process thereof is omitted herein.

Third Embodiment

The present embodiment provides an organic light-emitting diode pixel circuit and a driving method thereof.

The organic light-emitting diode pixel circuit according to the present embodiment is similar to that according the first embodiment, and also includes a touch fingerprint detection module and a compensation display module, wherein the touch fingerprint detection module of the present embodiment has the same structure as that in the first embodiment, and these two embodiments differ from each other only in that the compensation display modules thereof have different structures.

Figure 10:
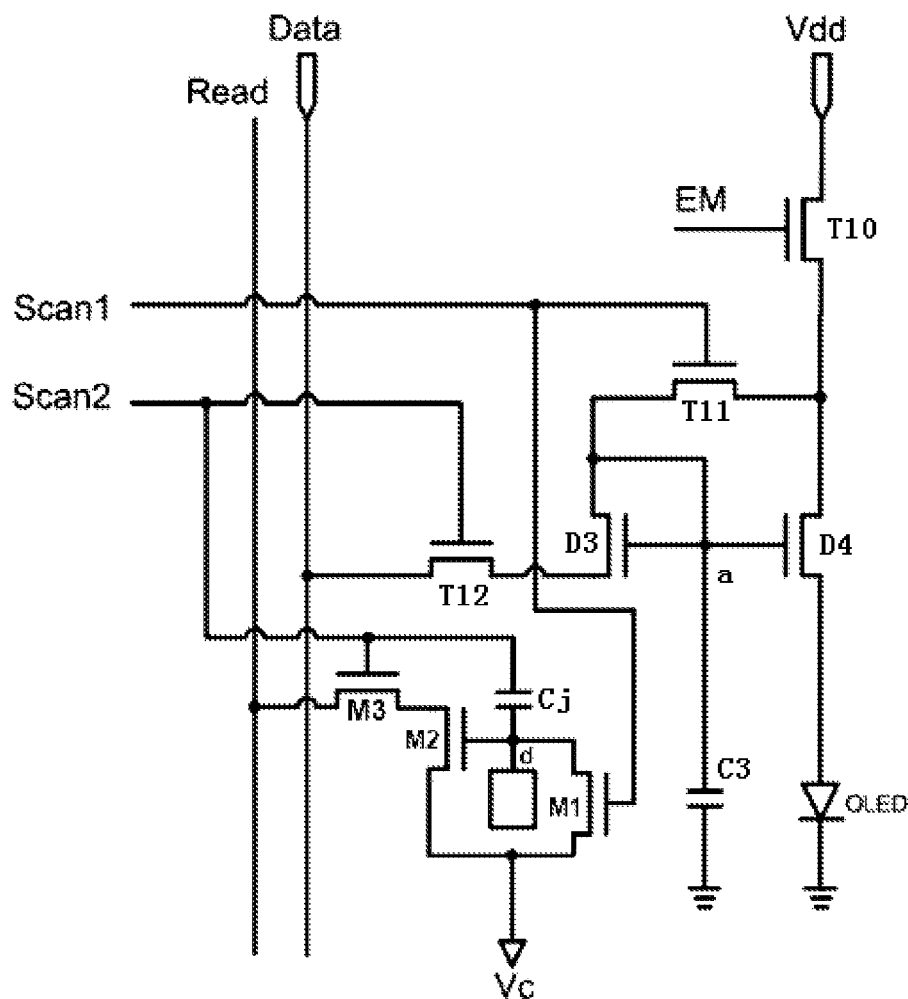
FIG. 10 is a schematic diagram showing an organic light-emitting diode pixel circuit according to a third embodiment of the present invention.

Referring to FIG. 10, the organic light-emitting diode pixel circuit (mainly the structure of the compensation display module) according to the present embodiment will be described in detail below.

Specifically, the compensation display module includes a third storage capacitor C3, an organic light-emitting diode OLED, a third driving transistor D3, a fourth driving transistor D4, a tenth switch transistor T10, an eleventh switch transistor T11, and a twelfth switch transistor T12, wherein, all of the transistors are N-type thin film transistors, and the third storage capacitor C3 includes a first electrode and a second electrode, and the first electrode of the third storage capacitor C3 is grounded;

a cathode of the organic light-emitting diode OLED is grounded;

a gate and a second electrode of the third driving transistor D3 are connected to the second electrode of the third storage capacitor C3;

a gate of the fourth driving transistor D4 is connected to the second electrode of the third storage capacitor C3;

a gate of the tenth switch transistor T10 is used for receiving a control signal EM, a first electrode thereof is connected to a second electrode of the fourth driving transistor D4, and a second electrode thereof is used for receiving a supply voltage Vdd;

a gate of the eleventh switch transistor T11 is used for receiving the first scanning signal Scan1, a first electrode thereof is connected to the second electrode of the third driving transistor D3, and a second electrode thereof is connected to the second electrode of the fourth driving transistor D4; and a gate of the twelfth switch transistor T12 is used for receiving the second scanning signal Scan2, a first electrode thereof is used for receiving the data signal Data, and a second electrode thereof is connected to a first electrode of the third driving transistor D3.

Figure 11:
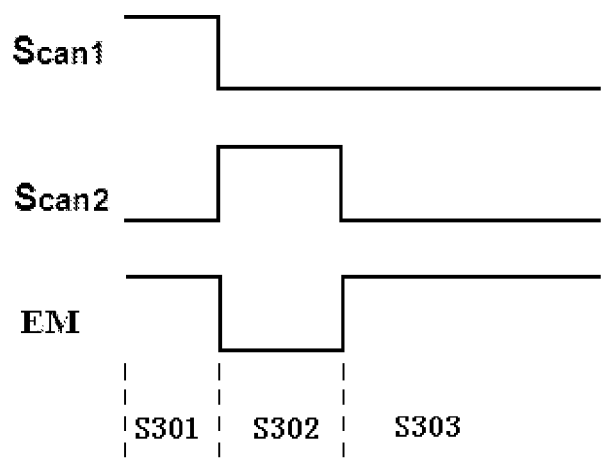
FIG. 11 is a schematic diagram showing a drive timing of the organic light-emitting diode pixel circuit as shown in FIG. 10.

Referring to FIG. 11, the operation principle of the above organic light-emitting diode pixel circuit will be explained in conjunction with a driving method thereof. The operation of the organic light-emitting diode pixel circuit includes a resetting stage, a reading and compensating stage, and a displaying stage. The driving method thereof specifically includes the following steps.

At Step S301: in the resetting stage, the first scanning signal Scan1 is set to a high level, the second scanning signal Scan2 is set to a low level, and the control signal EM is set to a high level, so that both the touch fingerprint detection module and the compensation display module are reset and charged;

Here, the first detecting transistor M1, the tenth switch transistor T10, and the eleventh switch transistor T11 are all turned on, while the third detecting transistor M3 and the twelfth switch transistor T12 are turned off.

In the touch fingerprint detection module, the first electrode (point d in the figure) of the detecting capacitor Cj is charged to the reference voltage Vc via the first detecting transistor M1, and the second electrode thereof is at the low level of the second scanning signal Scan2, and thus, the detecting capacitor Cj is reset.

In the compensation display module, the second electrode (point a in the figure) of the third storage capacitor C3 is charged to the supply voltage Vdd via the tenth switch transistor T10 and the eleventh switch transistor T11.

At Step S302: in the reading and compensating stage, the first scanning signal Scan1 is set to a low level, the second scanning signal Scan2 is set to a high level, the control signal EM is set to a low level, and the data signal Data is used as a driving voltage $V_{data}$ for driving the organic light-emitting diode OLED to display, so that the touch fingerprint detection module outputs its detection result, and the compensation display module obtains a correct compensation voltage.

At this time, the levels of all signals are reversed, thus the states of the transistors are also reversed.

In touch fingerprint detection module, the third detecting transistor M3 is turned on, thus the detection result of the touch fingerprint detection module can be transmitted to the read line Read via the third detecting transistor M3, so as to perform touch control and fingerprint recognition. The specific action principle and process are the same as those in the reading and displaying stage in the first embodiment (the difference therebetween only lies in that value of voltage at the second electrode of the detecting capacitor Cj is different), thus detailed description thereof is omitted herein.

In the compensation display module, the data signal Data charges the second electrode (point a in the figure) of the third storage capacitor C3 via the twelfth switch transistor T12 and the third driving transistor D3, until a gate-source voltage of the third driving transistor D3 reaches the threshold voltage $V_{th3}$ thereof, i.e., until a voltage at the point a reaches $(V_{th3}+V_{data})$.

At Step S303: in the displaying stage, both the first scanning signal Scan1 and the second scanning signal Scan2 are set to a low level, and the control signal EM is set to a high level, so that the compensation display module emits light and displays.

At this time, the third detecting transistor M3 is turned off, the detection result of the touch fingerprint detection module cannot be output any longer, which has no other influence on the circuit.

However, in the compensation display module, the tenth switch transistor T10 is turned on, the organic light-emitting diode OLED starts to emit light (i.e., starts to display), and a voltage at the anode thereof jumps to the light-emitting voltage $V_{oled}$ of the organic light-emitting diode OLED. Accordingly, at this time, a working current $I_{oled}$ of the organic light-emitting diode OLED passes through the fourth driving transistor D4, and a voltage at the gate of the fourth driving transistor D4 is equal to that at the second electrode (point a in the figure) of the third storage capacitor C3, i.e., equal to $(V_{th3}+V_{data})$. Since the fourth driving transistor D4 is in a saturation state, the working current $I_{oled}$ of the organic light-emitting diode OLED satisfies the following equation (where K is a coefficient):

$$I_{oled} = K(V_{gs} - V_{th4})^2$$
$$= K[(V_{th3} + V_{data}) - V_{oled} - V_{th4}]^2$$

Obviously, the gate of the third driving transistor D3 is connected to that of the fourth driving transistor D4, and the third driving transistor D3 and the fourth driving transistor D4 are located closely and have the same electric parameters. Thus, their threshold voltages $V_{th3}$ and $V_{th4}$ can be considered to be equal to each other according to the principle of mirror circuit, and the following equation can be obtained:

$$I_{oled}=K(V_{data}-V_{oled})^2$$

It can be seen that, the working current $I_{oled}$ when the organic light-emitting diode OLED is emitting light is independent from the threshold voltage of the driving transistor, thus an influence of a shift of the threshold voltage of the driving transistor on the emission brightness of the organic light-emitting diode OLED can be avoided, thereby achieving a better display effect.

When display of the current frame of image is completed, the process is returned to the Step S301 to start displaying the next frame of image.

Preferably, various modifications may be made to the organic light-emitting diode pixel circuit and the driving method thereof according to the present embodiment.

For example, it can be seen from the above driving method that, in the organic light-emitting diode pixel circuit according to the present embodiment, the state of the tenth switch transistor T10 is always opposite to that of the twelfth switch transistor T12 controlled by the second scanning signal Scan2, thus the tenth switch transistor T10 needs to be controlled by the separate control signal EM when it is an N-type thin film transistor as the twelfth switch transistor T12 is.

Figure 12:
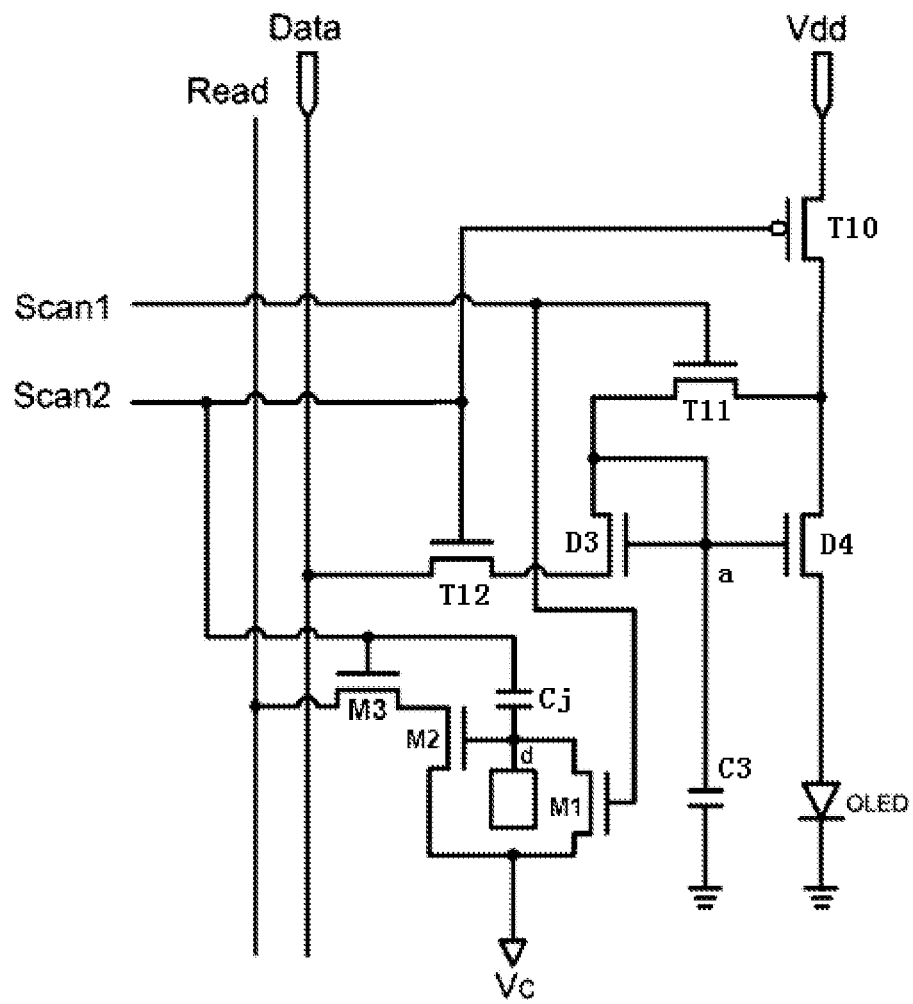
FIG. 12 is a schematic diagram showing another organic light-emitting diode pixel circuit according to the third embodiment of the present invention.
Figure 13:
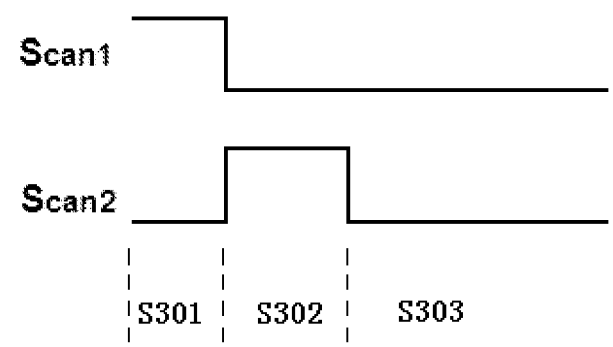
FIG. 13 is a schematic diagram showing a drive timing of the organic light-emitting diode pixel circuit as shown in FIG. 12.

Thus, preferably, as shown in FIG. 12, the tenth switch transistor T10 may be a P-type thin film transistor instead, and the gate thereof is used for receiving the second scanning signal Scan2 instead. As such, one control signal EM can be omitted without changing other structures (the types of the transistors, the connection of the circuit, and the like), thereby simplifying the structure of the circuit. Of course, since the control signal EM is absent in this case, the timing diagram of the driving signals is changed to that shown in FIG. 13, in which the control signal EM is absent.

In should be understood that, the above implementation just make some changes to some structures in the organic light-emitting diode pixel circuit and the driving timing thereof. However, in a driving process, the on-off state of each of the transistors does not change, thus detailed description of the specific driving process thereof is omitted herein.

It should be understood that, the above embodiments are only exemplary embodiments for the purpose of explaining the principle of the present invention, but the present invention is not limited thereto. For a person having ordinary skill in the art, various improvements and modifications may be made without departing from the spirit and essence of the present invention. These improvements and modifications also fall within the protection scope of the present invention.

What is claimed is:

1. An organic light-emitting diode pixel circuit, comprising:
a touch fingerprint detection module, which is configured to detect whether a touch occurs or not and whether the touch is caused by a convex portion of a fingerprint or a concave portion of the fingerprint, and send a result of the detection to a read line, under the control of a first scanning signal and a second scanning signal; and
a compensation display module comprising an organic light-emitting diode and at least one driving transistor, and is configured to eliminate a shift of a threshold voltage of the at least one driving transistor and drive the organic light-emitting diode to display under the control of at least the first scanning signal, the second scanning signal, and a data signal, wherein,
the touch fingerprint detection module comprises a detecting capacitor, a first detecting transistor, a second detecting transistor, and a third detecting transistor,
the detecting capacitor comprises a first electrode for sensing a touch and a second electrode opposite to the first electrode, and the second electrode of the detecting capacitor is used for receiving the second scanning signal,
a gate of the first detecting transistor is used for receiving the first scanning signal, a first electrode thereof is used for receiving a reference voltage, and a second electrode thereof is connected to the first electrode of the detecting capacitor,
a gate of the second detecting transistor is connected to the first electrode of the detecting capacitor, a first electrode thereof is used for receiving the reference voltage, and a second electrode thereof is connected to a first electrode of the third detecting transistor, and a gate of the third detecting transistor is used for receiving the second scanning signal, and a second electrode thereof is connected to the read line.

2. The organic light-emitting diode pixel circuit according to claim 1, wherein, the compensation display module comprises a first storage capacitor, the organic light-emitting diode, a first driving transistor, a first switch transistor, a second switch transistor, a third switch transistor, a fourth switch transistor, and a fifth switch transistor, wherein, the first driving transistor, all of the switch transistors, and all of the detecting transistors are N-type thin film transistors, and the first storage capacitor comprises a first electrode and a second electrode;

a cathode of the organic light-emitting diode is grounded;

a gate of the first driving transistor is connected to the second electrode of the first storage capacitor, and a first electrode thereof is connected to an anode of the organic light-emitting diode;

a gate of the first switch transistor is used for receiving the second scanning signal, a first electrode thereof is connected to a second electrode of the first driving transistor, and a second electrode thereof is used for receiving a supply voltage;

a gate of the second switch transistor is used for receiving the first scanning signal, a first electrode thereof is connected to the second electrode of the first storage capacitor, and a second electrode thereof is connected to the second electrode of the first driving transistor;

a gate of the third switch transistor is used for receiving the first scanning signal, a first electrode thereof is used for receiving the data signal, and a second electrode thereof is connected to the first electrode of the first storage capacitor;

a gate of the fourth switch transistor is used for receiving the second scanning signal, a first electrode thereof is connected to the first electrode of the first storage capacitor, and a second electrode thereof is connected to the anode of the organic light-emitting diode; and a gate of the fifth switch transistor is used for receiving the first scanning signal, a first electrode thereof is grounded, and a second electrode thereof is connected to the anode of the organic light-emitting diode.

3. A driving method for the organic light-emitting diode pixel circuit according to claim 2, the driving method comprising:

resetting and charging both the touch fingerprint detection module and the compensation display module;

causing the compensation display module to obtain a correct compensation voltage;

causing the touch fingerprint detection module to detect a touch and output a result of the detection;

causing the compensation display module to emit light and display;

in a resetting stage, setting both the first scanning signal and the second scanning signal to a high level;

in a compensating stage, setting the first scanning signal to a high level, setting the second scanning signal to a low level, and using the data signal as a driving voltage for driving the organic light-emitting diode to display; and in a reading and displaying stage, setting the first scanning signal to a low level, and setting the second scanning signal to a high level.

4. The driving method according to claim 3, wherein, between the compensating stage and the reading and displaying stage, the driving method further comprising:

a buffering stage, in which both the first scanning signal and the second scanning signal are set to a low level.

5. The organic light-emitting diode pixel circuit according to claim 1, wherein, the compensation display module comprises a second storage capacitor, the organic light-emitting diode, a second driving transistor, a sixth switch transistor, a seventh switch transistor, an eighth switch transistor, and a ninth switch transistor, wherein, the second driving transistor, all of the switch transistors, and all of the detecting transistors are N-type thin film transistors, and the second storage capacitor comprises a first electrode and a second electrode;

a cathode of the organic light-emitting diode is grounded;

a gate of the second driving transistor is connected to the second electrode of the second storage capacitor, and a first electrode thereof is connected to an anode of the organic light-emitting diode;

a gate of the sixth switch transistor is used for receiving the second scanning signal, a first electrode thereof is connected to a second electrode of the second driving transistor, and a second electrode thereof is used for receiving a supply voltage;

a gate of the seventh switch transistor is used for receiving the first scanning signal, a first electrode thereof is connected to the second electrode of the second storage capacitor, and a second electrode thereof is connected to the second electrode of the second driving transistor;

a gate of the eighth switch transistor is used for receiving a control signal, a first electrode thereof is used for receiving the data signal, and a second electrode thereof is connected to the first electrode of the second storage capacitor; and a gate of the ninth switch transistor is used for receiving the first scanning signal, a first electrode thereof is grounded, and a second electrode thereof is connected to the anode of the organic light-emitting diode.

6. A driving method for the organic light-emitting diode pixel circuit according to claim 5, the driving method comprising:

resetting and charging both the touch fingerprint detection module and the compensation display module;

causing the compensation display module to obtain a correct compensation voltage;

causing the touch fingerprint detection module to detect a touch and output a result of the detection;

causing the compensation display module to emit light and display;

in a resetting stage, setting both the first scanning signal and the second scanning signal to a high level, and setting the control signal to a low level;

in a compensating stage, setting the first scanning signal to a high level, setting the second scanning signal to a low level, and setting the control signal to a high level;

in a writing stage, setting the first scanning signal to a low level, setting the second scanning signal to a low level, setting the control signal to a high level, and using the data signal as a driving voltage for driving the organic light-emitting diode to display; and in a reading and displaying stage, setting the first scanning signal to a low level, setting the second scanning signal to a high level, and setting the control signal to a low level.

7. The organic light-emitting diode pixel circuit according to claim 1, wherein, the compensation display module comprises a second storage capacitor, the organic light-emitting diode, a second driving transistor, a sixth switch transistor, a seventh switch transistor, an eighth switch transistor, and a ninth switch transistor, wherein, the second driving transistor, the sixth switch transistor, the seventh switch transistor, the ninth switch transistor, and all of the detecting transistors are N-type thin film transistors, the eighth switch transistor is a P-type thin film transistor, and the second storage capacitor comprises a first electrode and a second electrode;

a cathode of the organic light-emitting diode is grounded;

a gate of the second driving transistor is connected to the second electrode of the second storage capacitor, and a first electrode thereof is connected to an anode of the organic light-emitting diode;

a gate of the sixth switch transistor is used for receiving the second scanning signal, a first electrode thereof is connected to a second electrode of the second driving transistor, and a second electrode thereof is used for receiving a supply voltage;

a gate of the seventh switch transistor is used for receiving the first scanning signal, a first electrode thereof is connected to the second electrode of the second storage capacitor, and a second electrode thereof is connected to the second electrode of the second driving transistor;

a gate of the eighth switch transistor is used for receiving the second scanning signal, a first electrode thereof is used for receiving the data signal, and a second electrode thereof is connected to the first electrode of the second storage capacitor; and a gate of the ninth switch transistor is used for receiving the first scanning signal, a first electrode thereof is grounded, and a second electrode thereof is connected to the anode of the organic light-emitting diode.

8. A driving method for the organic light-emitting diode pixel circuit according to claim 7, the driving method comprising:

resetting and charging both the touch fingerprint detection module and the compensation display module;

causing the compensation display module to obtain a correct compensation voltage;

causing the touch fingerprint detection module to detect a touch and output a result of the detection;

causing the compensation display module to emit light and display;

in a resetting stage, setting both the first scanning signal and the second scanning signal to a high level;

in a compensating stage, setting the first scanning signal to a high level, and setting the second scanning signal to a low level;

in a writing stage, setting the first scanning signal to a low level, setting the second scanning signal to a low level, and using the data signal as a driving voltage for driving the organic light-emitting diode to display; and in a reading and displaying stage, setting the first scanning signal to a low level, and setting the second scanning signal to a high level.

9. The organic light-emitting diode pixel circuit according to claim 1, wherein, the compensation display module comprises a second storage capacitor, the organic light-emitting diode, a second driving transistor, a sixth switch transistor, a seventh switch transistor, an eighth switch transistor, and a ninth switch transistor, wherein, the second driving transistor, the seventh switch transistor, the eighth switch transistor, the ninth switch transistor, the first detecting transistor, and the second detecting transistor are N-type thin film transistors, the sixth switch transistor and the third detecting transistor are P-type thin film transistors, and the second storage capacitor comprises a first electrode and a second electrode;

a cathode of the organic light-emitting diode is grounded;

a gate of the second driving transistor is connected to the second electrode of the second storage capacitor, and a first electrode thereof is connected to an anode of the organic light-emitting diode;

a gate of the sixth switch transistor is used for receiving the second scanning signal, a first electrode thereof is connected to a second electrode of the second driving transistor, and a second electrode thereof is used for receiving a supply voltage;

a gate of the seventh switch transistor is used for receiving the first scanning signal, a first electrode thereof is connected to the second electrode of the second storage capacitor, and a second electrode thereof is connected to the second electrode of the second driving transistor;

a gate of the eighth switch transistor is used for receiving the second scanning signal, a first electrode thereof is used for receiving the data signal, and a second electrode thereof is connected to the first electrode of the second storage capacitor; and a gate of the ninth switch transistor is used for receiving the first scanning signal, a first electrode thereof is grounded, and a second electrode thereof is connected to the anode of the organic light-emitting diode.

10. A driving method for the organic light-emitting diode pixel circuit according to claim 9, the driving method comprising:

resetting and charging both the touch fingerprint detection module and the compensation display module;

causing the compensation display module to obtain a correct compensation voltage;

causing the touch fingerprint detection module to detect a touch and output a result of the detection;

causing the compensation display module to emit light and display;

in a resetting stage, setting the first scanning signal to a high level, and the second scanning signal to a low level;

in a compensating stage, setting the first scanning signal to a high level, and setting the second scanning signal to a high level;

in a writing stage, setting the first scanning signal to a low level, setting the second scanning signal to a high level, and using the data signal as a driving voltage for driving the organic light-emitting diode to display; and in a reading and displaying stage, setting both the first scanning signal and the second scanning signal to a low level.

11. The organic light-emitting diode pixel circuit according to claim 1, wherein, the compensation display module comprises a third storage capacitor, the organic light-emitting diode, a third driving transistor, a fourth driving transistor, a tenth switch transistor, an eleventh switch transistor, and a twelfth switch transistor, wherein, all of the driving transistors, all of the switch transistors, and all of the detecting transistors are N-type thin film transistors, and the third storage capacitor comprises a first electrode and a second electrode, and the first electrode of the third storage capacitor is grounded;

a cathode of the organic light-emitting diode is grounded;

both a gate and a second electrode of the third driving transistor are connected to the second electrode of the third storage capacitor;

a gate of the fourth driving transistor is connected to the second electrode of the third storage capacitor;

a gate of the tenth switch transistor is used for receiving a control signal, a first electrode thereof is connected to a second electrode of the fourth driving transistor, and a second electrode thereof is used for receiving a supply voltage;

a gate of the eleventh switch transistor is used for receiving the first scanning signal, a first electrode thereof is connected to the second electrode of the third driving transistor, and a second electrode thereof is connected to the second electrode of the fourth driving transistor; and a gate of the twelfth switch transistor is used for receiving the second scanning signal, a first electrode thereof is used for receiving the data signal, and a second electrode thereof is connected to a first electrode of the third driving transistor.

12. A driving method for the organic light-emitting diode pixel circuit according to claim 11, the driving method comprising:

resetting and charging both the touch fingerprint detection module and the compensation display module;

causing the compensation display module to obtain a correct compensation voltage;

causing the touch fingerprint detection module to detect a touch and output a result of the detection;

causing the compensation display module to emit light and display;

in a resetting stage, setting the first scanning signal to a high level, setting the second scanning signal to a low level, and setting the control signal to a high level;

in a reading and compensating stage, setting the first scanning signal to a low level, setting the second scanning signal to a high level, setting the control signal to a low level, and using the data signal as a driving voltage for driving the organic light-emitting diode to display; and in a displaying stage, setting both the first scanning signal and the second scanning signal to a low level, and setting the control signal to a high level.

13. The organic light-emitting diode pixel circuit according to claim 1, wherein, the compensation display module comprises a third storage capacitor, the organic light-emitting diode, a third driving transistor, a fourth driving transistor, a tenth switch transistor, an eleventh switch transistor, and a twelfth switch transistor, wherein, all of the driving transistors, the eleventh switch transistor, the twelfth switch transistor, and all of the detecting transistors are N-type thin film transistors, the tenth switch transistor is a P-type thin film transistor, and the third storage capacitor comprises a first electrode and a second electrode, and the first electrode of the third storage capacitor is grounded;

a cathode of the organic light-emitting diode is grounded;

a gate and a second electrode of the third driving transistor are connected to the second electrode of the third storage capacitor;

a gate of the fourth driving transistor is connected to the second electrode of the third storage capacitor;

a gate of the tenth switch transistor is used for receiving the second scanning signal, a first electrode thereof is connected to a second electrode of the fourth driving transistor, and a second electrode thereof is used for receiving a supply voltage;

a gate of the eleventh switch transistor is used for receiving the first scanning signal, a first electrode thereof is connected to the second electrode of the third driving transistor, and a second electrode thereof is connected to the second electrode of the fourth driving transistor; and a gate of the twelfth switch transistor is used for receiving the second scanning signal, a first electrode thereof is used for receiving the data signal, and a second electrode thereof is connected to a first electrode of the third driving transistor.

14. A driving method for the organic light-emitting diode pixel circuit according to claim 13, the driving method comprising:

resetting and charging both the touch fingerprint detection module and the compensation display module;

causing the compensation display module to obtain a correct compensation voltage;

causing the touch fingerprint detection module to detect a touch and output a result of the detection;

causing the compensation display module to emit light and display;

in a resetting stage, setting the first scanning signal to a high level, and setting the second scanning signal to a low level;

in a reading and compensating stage, setting the first scanning signal to a low level, setting the second scanning signal to a high level, and using the data signal as a driving voltage for driving the organic light-emitting diode to display; and in a displaying stage, setting both the first scanning signal and the second scanning signal to a low level.

15. A driving method for the organic light-emitting diode pixel circuit according to claim 1, the driving method comprising:

resetting and charging both the touch fingerprint detection module and the compensation display module;

causing the compensation display module to obtain a correct compensation voltage;

causing the touch fingerprint detection module to detect a touch and output a result of the detection; and causing the compensation display module to emit light and display.

* * * * *